United States Patent [19]

Cser et al.

[11] Patent Number: 4,858,569
[45] Date of Patent: Aug. 22, 1989

[54] RECIPROCATING PISTON-TYPE INTERNAL COMBUSTION ENGINE WITH RESONANCE CHARGING

[75] Inventors: Gyula Cser, Budapest; Antal Csikos, Érdliget; Péter Timár, Budapest, all of Hungary

[73] Assignee: Autóipari Kutató és Fejleszto Vállalat, Budapest, Hungary

[21] Appl. No.: 154,392

[22] Filed: Feb. 10, 1988

[30] Foreign Application Priority Data

Feb. 12, 1987 [HU] Hungary .................................. 546/87
Jul. 23, 1987 [HU] Hungary .................................. 546/87

[51] Int. Cl.⁴ ............................................. F02M 35/10
[52] U.S. Cl. ........................... 123/52 MB; 123/52 MC
[58] Field of Search ......... 123/52 M, 52 MB, 52 MV, 123/52 MF, 52 MC, 559.1

[56] References Cited

U.S. PATENT DOCUMENTS

| 3,796,048 | 5/1983 | Annus et al. | 123/52 M |
| 4,353,211 | 10/1982 | Cser et al. | 123/52 M |
| 4,444,013 | 4/1984 | Inoue et al. | 123/52 M |
| 4,513,699 | 4/1985 | Cser | 123/52 MB |

FOREIGN PATENT DOCUMENTS

| 1935155 | 2/1970 | Fed. Rep. of Germany . | |
| 2245732 | 11/1982 | Fed. Rep. of Germany . | |
| 2949790 | 11/1983 | Fed. Rep. of Germany . | |
| 3314911 | 2/1984 | Fed. Rep. of Germany . | |
| 0115818 | 9/1981 | Japan | 123/52 MB |
| 59-22249 | 9/1984 | Japan . | |
| 0252830 | 11/1986 | Japan | 123/52 M |
| 1400059 | 7/1975 | United Kingdom . | |

Primary Examiner—David A. Okonsky
Attorney, Agent, or Firm—Spencer & Frank

[57] ABSTRACT

A reciprocating piston-type internal combustion engine includes an intake gas conduit assembly in which intake gas resonance oscillations are generated for increasing the charging efficiency of the cylinders. The intake gas conduit assembly has a feed resonance system including a feed resonator vessel connected with the intake ports of a group of cylinders whose suction strokes do not significantly overlap and a feed resonance pipe communicating with the feed resonator vessel. The intake gas conduit assembly further has an auxiliary resonance system including a closed auxiliary resonator vessel and an auxiliary resonance pipe opening into the auxiliary resonator vessel, an intermediate resonator vessel coupled with the auxiliary resonance pipe and the feed resonance pipe and an intake gas inlet pipe coupled with the intermediate resonator vessel. The feed resonance system and the auxiliary resonance system are tuned to one another by a dimensional selection such that at a predetermined first resonance rpm of the engine the intake gas oscillations generated in the feed resonance pipe and the auxiliary resonance pipe by intermittent suction strokes of the cylinders forming the group are in phase effecting an increase in the charging efficiency and the intermediate resonator vessel is dimensioned such that at a predetermined second resonance rpm of the engine in an operational rpm range the oscillations in the feed resonance pipe and the auxiliary resonance pipe are of opposite phase, effecting an increase in the charging efficiency.

14 Claims, 4 Drawing Sheets

RECIPROCATING PISTON-TYPE INTERNAL COMBUSTION ENGINE WITH RESONANCE CHARGING

BACKGROUND OF THE INVENTION

This invention relates to a reciprocating piston-type internal combustion engine in which the charging efficiency is increased by causing resonance oscillations of the air or air/fuel mixture (hereafter collectively referred to as "intake gas") as it is introduced into the engine cylinders.

The engine comprises a gas intake conduit assembly which has a feed resonance system including a feed resonator vessel connected directly or by coupling pipes with the respective intake ports of a group of cylinders whose suction strokes do not substantially overlap, if at all. The feed resonance system further has a feed resonance pipe which opens into the feed resonator vessel. The feed resonance pipe has an end which is remote from the feed resonator vessel and which is arranged for receiving the intake gas for charging the associated cylinders. By virtue of the intermittent suction effect of the cylinders, in the feed resonator vessel and the feed resonance pipe intake gas oscillations are generated, as a result of which, in a predetermined resonance rpm range whose magnitude is a function of the dimensions of the intake gas conduit assembly, the degree of charging efficiency of the engine cylinder significantly increases. The frequency of the above-noted intake gas oscillations is significantly lower and their amplitude significantly larger than the sound pressure oscillations or pipe oscillations also generated in the intake gas conduit assembly. Although these last-named oscillations are superposed on the intake air resonance oscillations, their effect is substantially below that of the intake gas resonance oscillations.

The principle and basic solution for the resonance charging of a reciprocating piston-type internal combustion engine are known and are described, for example, in German patent Nos. 1,935,155 and 2,245,732 as well as U.S. Pat. Nos. 3,796,048 and 4,513,699. With the appropriate choice of the dimensions of the feed resonance system it is feasible to obtain the resonance rpm within a desired operational rpm range, particularly in a low rpm range of the engine so that the resonance charging may be combined with an exhaust gas turbocharger whose greatest effect is in the range of the rated rpm. Such a known resonance charging system may find the most effective and advantageous application in six-cylinder in-line engines of such a type where in each instance those three cylinders whose suction strokes do not overlap are in communication with a common feed resonator vessel and the two resonance systems are connected to one another with a compensating vessel into which merge the two feed resonance pipes and which is supplied with intake gas.

In internal combustion engines which have, for example, four cylinders, an effective resonance charging may be achieved by providing for the feed resonance system a closed auxiliary resonator vessel into which merges an auxiliary resonance pipe, whereby an auxiliary resonance system is obtained which communicates with the feed resonance pipe of the feed resonance system by means of an intermediate vessel supplied with intake gas. In such a case the feed resonance system and the auxiliary resonance system are dimensioned relative to one another such that at a predetermined engine rpm at which resonance occurs, the intake gas oscillations in the feed resonance pipe, generated by the intermittent suction strokes of the cylinders, are in phase, whereby the charging efficiency is increased. Stated differently, the movements of intake gas in the feed resonance pipe and the auxiliary resonance pipe coincide in velocity and direction. Such an arrangement is disclosed in German Patent No. 2,949,790, making feasible the smallest possible dimensioning for the intermediate vessel so that despite the limited space in the zone of the engine, the intermediate vessel may be accommodated without difficulties.

In all known embodiments of intake gas resonance systems there exists a predetermined resonance frequency which may be tuned to the desired operational rpm range by an appropriate design of the dimensions of the resonator vessels and resonance pipes. An rpm-dependent alteration of the resonance frequency may, however, also be achieved by altering the dimensions of the resonance system in an rpm-dependent manner. From Japanese Utility Model No. 59 22 249 it is known to vary the resonance pipe length as a function of the rpm. It is further known to provide one wall of the resonator vessel with a bounding piston which adjusts the volume of the resonator vessel as a function of the rpm. According to German Offenlegungsschrift (Non-examined Published Application) No. 3,314,911 two resonance pipes are interconnected by means of a short coupling conduit in which a butterfly valve is arranged which may be set in an rpm-dependent manner such that as a result of an opening or a closing of the butterfly valve two different resonance frequencies are obtained. For improving the torque characteristics the regulating and setting devices necessary for obtaining different resonance frequencies tend to be prohibitively expensive when compared with the achievable advantages and also, structural and operational difficulties may arise.

SUMMARY OF THE INVENTION

It is an object of the invention to provide an improved resonance system in a reciprocating piston-type internal combustion engine wherein the intake gas conduit assembly is such that intake gas resonance oscillations appear at two different resonance rpm s within the operating rpm range without the need for regulating and setting mechanisms for changing the effective dimensions of the intake gas conduit assembly and without limiting the engine designer in a free selection of the resonance rpm's. As a result of such considerations it is feasible to design the resonance system based on the desired course of the engine torque curve or the charging efficiency curve as a function of the rpm.

The invention is based on the recognition that the object of the invention can be achieved with a gas intake conduit system structured in principle in accordance with German Patent No. 2,949,790, by coupling the intermediate vessel (provided with a gas intake connection) to the resonance system.

The above objects and others to become apparent as the specification progresses, are accomplished by the invention, according to which, briefly stated, the gas intake conduit system of the reciprocating piston-type internal combustion engine according to the invention has a feed resonance system including a feed resonator vessel which is directly—or by coupling pipes—connected with the intake ports of a group of engine cylinders whose suction strokes do not overlap or overlap only in an insubstantial manner. The feed resonance system further has a feed resonance pipe merging into the feed resonator vessel as well as an auxiliary resonance system including a closed auxiliary resonator vessel as well as an auxiliary resonance pipe merging into the auxiliary resonance system. The auxiliary resonance pipe is coupled to the feed resonance pipe with an intermediate vessel into which an intake gas supply connection (intake gas inlet pipe) merges.

Further, the intake gas resonance system and the auxiliary resonance system are dimensionally coordinated such that at a predetermined resonance rpm of the reciprocating piston-type internal combustion engine the intake gas oscillations generated in the intake gas conduit system by the intermittent suction strokes of the cylinders are in phase in the feed resonance pipe and the auxiliary resonance pipe, resulting in an increase of the charging efficiency.

Further, according to a salient feature of the invention, the intermediate vessel is designed as an intermediate resonator vessel such that the intake gas oscillations in the feed resonance pipe and the auxiliary resonance pipe are of opposite phase at a predetermined second resonance rpm of the internal combustion engine, resulting in an increase of the charging efficiency.

As disclosed in German Patent No. 2,949,790, the magnitude of the volume of the intermediate vessel is of no importance so that the intermediate vessel may be as small as possible taking into account spatial considerations. Although in such a solution there may theoretically exist a second resonance rpm at which the oscillations in the feed resonance pipe and the auxiliary resonance pipe are of opposite phase, such a second locus of resonance, because of the small volume of the intermediate vessel, remains very substantially above the operational rpm range of the internal combustion engine in the known gas intake conduit system thereof. In view of the fact that the prior art engine is not able to operate at the second resonance rpm or an rpm close thereto, the state of resonance at the second resonance rpm does not set in during the operation of the engine and thus cannot be utilized for increasing the charging efficiency.

In contradistinction, the intermediate vessel of the intake gas resonance system according to the invention has a significantly larger volume whose minimum size is determined by the fact that, according to the invention, the second locus of resonance must be within the range of the operational rpm and thus it may be utilized for increasing the charging efficiency within the operational rpm range of the engine.

DESCRIPTION OF THE PREFERRED EMBODIMENTS

Figure 1:
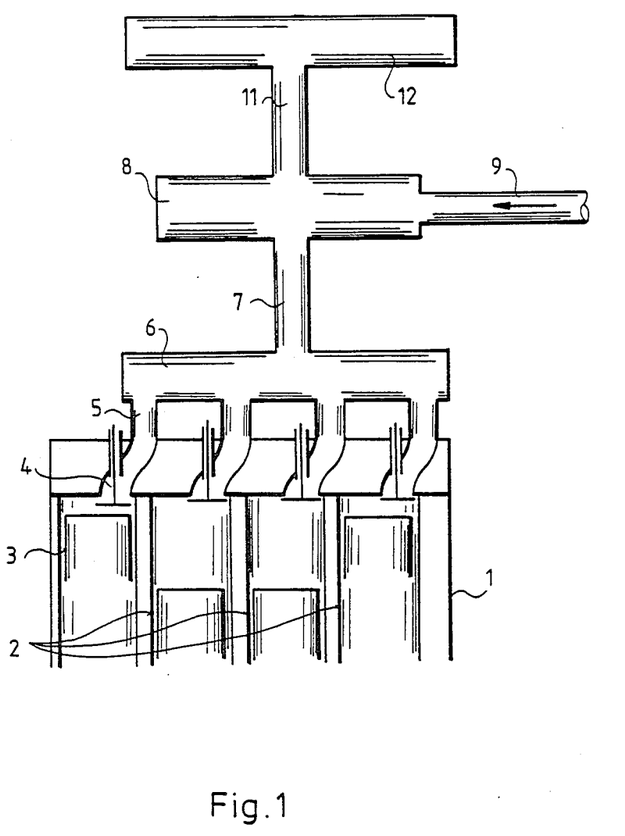
FIG. 1 is a schematic side elevational view of a first preferred embodiment of the invention with intake gas admission directly from the environment.

Turning to FIG. 1, there is illustrated therein a four-cycle, four-cylinder reciprocating piston-type internal combustion engine 1 whose cylinders 2 have an ignition interval of 180° of crankshaft rotation. Thus, the cylinders 2 of the engine 1 have suction strokes which do not overlap or overlap only insubstantially.

The intake ports 4 of the four cylinders 2 are coupled to a common feed resonator vessel 6 with the intermediary of separate coupling pipes 5. A feed resonance pipe 7 merges into the feed resonator vessel 6 and introduces intake gas thereinto. There is further provided an auxiliary resonator vessel 12 and an auxiliary resonance pipe 11 which constitute an auxiliary resonance system. The auxiliary resonance pipe 11 is coupled with the feed resonance pipe 7 by means of an intermediate resonator vessel 8.

By virtue of the above-described design of the feed resonance system and the auxiliary resonance system on the one hand and the size of the intermediate resonator vessel 8 on the other hand, within the operational rpm range of the internal combustion engine 1 there are obtained two loci of resonance. The charging efficiency of the engine 1 is increased in two operational rpm ranges at these loci of resonance by virtue of the pneumatic gas oscillations in the intake gas system.

At the first locus of resonance, by virtue of the presence of the auxiliary resonance system 11, 12, the oscillations of the intake gas introduced into the intermediate resonator vessel 8 are identical as to velocity and direction in both the feed resonance pipe 7 and the auxiliary resonance pipe 11. In contradistinction, at a second locus of resonance which is different from the first locus of resonance and which is determined by the size of the intermediate resonator vessel 8, there are generated oscillations of opposite direction while the velocity and amplitude are identical. In both instances—based on the states of oscillation in the intake gas system—the result is an increase of the degree of charging efficiency of the cylinders 2 of the internal combustion engine 1.

In order to make possible the resonance conditions according to the preferred embodiment shown in FIG. 1 wherein the gas intake is effected by natural aspiration, that is, directly from the environment as a result of the suction effect of the pistons 3 moving in the respective cylinders 2, an air inlet pipe 9 opens into the intermediate resonator vessel 8 and cooperates with the intermediate resonator vessel 8 as a resonator pipe. In the preferred embodiment illustrated in FIG. 2, on the other hand, the intake gas supply into the intermediate resonator vessel 8 is effected by an exhaust gas-driven turbocharger and the intake gas coupling is effected by the pressure pipe 15 of the compressor of the turbocharger 14. Further, in the FIG. 2 embodiment both ends 7a and 11a of the respective resonance pipes 7 and 11 flare towards their respective ends in a diffusor-like manner, whereby the length of the resonance pipes 7 and 11 may be reduced without changing the loci of resonance of the intake gas conduit system.

For facilitating the understanding of the operation of the gas oscillating system according to the invention, one may examine a mechanically equivalent spring-mass-spring-mass-spring system. The oscillation is generated at the first spring. To the first spring there corresponds the feed resonance volume which is formed by the sum of the volumes of the feed resonator vessel 6, the intake ports 4 and coupling pipes 5 (if present) as well as the average volume of each and every cylinder volume in communication with the feed resonator vessel 6 during one cycle of the intake gas oscillation.

What is meant by "average volume" may be explained in different term as follows: the intake valve of each cylinder is in an open state during a rotation of α° (for example, 150°) of the crankshaft. For the cylinders coupled to one and the same feed resonator vessel the open state occurs at different, substantially not overlapping periods during each revolution (360° turn) of the crankshaft. Viewing each cylinder individually, during the time period corresponding to the rotation of α° (open state of the intake valve) the piston will be at different axial heights in the cylinder and consequently, at each moment the cylinder volume bounded by the radial face of the piston and being in communication with the feed resonator vessel through the open intake valve varies. If one takes, for example, fifty sequential readings of such varying cylinder volume during the open state of the intake valve, the average volume of each cylinder will be the sum of the volumes measured in each of the fifty instances, divided by fifty. There is, of course, no need to take actual measurements; the "average volume" may be calculated based on the dimensional design of the engine.

It is thus apparent from the above explanations that in case the suction strokes (that is, the open state of the intake valves) of the cylinders coupled to one and the same feed resonator vessel do not overlap at all, the "average volume" will be that of a single cylinder. If, on the other hand, the engine design is such that some overlap does exist between the suction strokes of two cylinders coupled to one and the same feed resonator vessel, the "average volume" will be the sum of the average volume of the oscillation-generating cylinder—as explained above—and the average volume of the other cylinder calculated only for the simultaneous open state of both cylinders.

The mass of the intake gas flowing in the feed resonance pipe 7 corresponds to the first mass coupled to the first spring. To the second spring in the mechanically equivalent system there corresponds the resonance volume of the intermediate resonator vessel 8; to the second mass there corresponds the mass of the intake gas flowing in the auxiliary resonance pipe 11 and to the third spring there corresponds the volume of the auxiliary resonator vessel 12.

At the first locus of resonance both masses oscillate in identical directions with the same velocity and amplitude, whereas at the second locus of resonance the oscillation is in opposite directions, but at the same velocity and amplitude. At the first locus of resonance, only slight pressure fluctuation occurs in the intermediate resonator vessel 8. Thus, the stiffness of this spring does not affect the magnitude of the first own (resonance) frequency, that is, it does not affect the numerical value of the first locus of resonance. At the second locus of resonance, in the intermediate resonator vessel 8 significant pressure fluctuations appear, similarly to those in the feed resonator vessel 6 and the auxiliary resonator vessel 12. Therefore, the stiffness of the mechanical spring representing the resonance volume of the intermediate resonator vessel 8 significantly affects the value of the second own (resonance) frequency. During the half periods when there is a pressure maximum in the intermediate resonator vessel 8, the intake gas in the feed resonance pipe 7 accelerates additionally towards the feed resonator vessel 6, as a result of which in the latter the pressure increases and therefore the charging efficiency and the average pressure increases in the cylinder volume open momentarily towards the resonator vessel 6.

In this connection it has to be noted that the identical or opposite "directions" of the gas oscillations do not require a linear or aligned axis for the resonance pipes 7 and 11. Rather, the identical or opposite "directions" of the gas oscillations relate to the momentary gas flow directions in the resonance pipes 7 and 11: if the gas flow in both resonance pipes is directed simultaneously into or out of the intermediate resonator vessel 8 then the directions of oscillations are opposite to one another, while if the gas flows into (or out of) the intermediate resonator vessel 8 from (or into) the resonance pipe 7 and simultaneously the gas flows out of (or into) the intermediate resonator vessel 8 into (or from) the resonance pipe 11, the directions of oscillation are identical.

Figure 2:
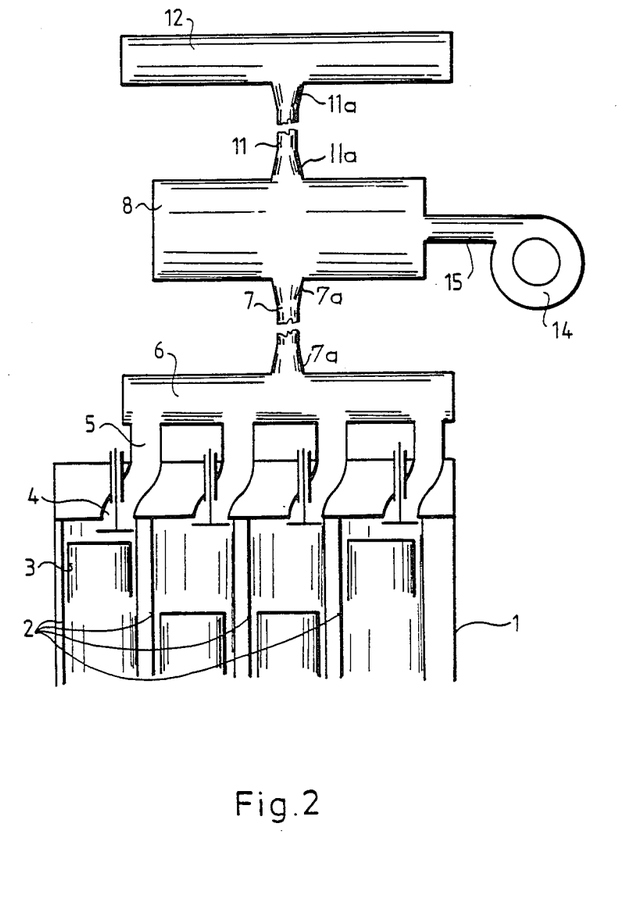
FIG. 2 is a schematic side elevational view of a second preferred embodiment with intake gas admission by means of a turbocharger.

According to the invention, the intermediate resonator vessel 8 is so designed that the intake gas oscillations in the feed resonance pipe 7 and the auxiliary resonance pipe 11 are of opposite direction at the second locus of resonance (second resonance rpm) of the internal combustion engine. In the design of the intermediate resonator vessel 8 it is of importance that the intake gas volume in the intermediate resonator vessel 8 function as a "spring" at the second resonance rpm which is alternatingly compressed and released to thus achieve that in the intermediate resonator vessel 8 the desired significant pressure fluctuations are generated. The flow conditions in the gas inlet pipe 9 (FIG. 1) or the pressure pipe 15 (FIGS. 2 and 3) are also decisive for this purpose. It is a necessary condition that the pressure oscillations appearing in the intermediate resonator vessel 8 must not be impeded by the presence of the gas inlet couplings 9 or 15. Since, according to the embodiment shown in FIG. 1, the internal combustion engine 1 obtains intake gas by suction directly from the environment without the aid of an auxiliary charger, particularly an exhaust gas-driven turbocharger, the design of the intermediate resonator vessel 8 according to the invention is tied to the design of the intake pipe 9 as a resonance pipe. If, on the other hand, the intake gas is supplied, as shown in FIG. 2, by a compressor, particularly a compressor of a turbocharger 14, the constant gas supply at the pressure side of the compressor may be sufficient to ensure the efficiency of the intermediate resonator vessel 8 as a resonator vessel at the second resonance frequency. In such a case therefore, the intake gas coupling may be effected by a longer or shorter pressure pipe 15 of the compressor.

In a given feed resonance system the second resonance rpm may be set by varying the intermediate resonance volume. The relationship of the second resonance rpm to the first resonance rpm within the operational rpm range of the internal combustion engine 1 is determined by the ratio of the intermediate resonance volume to the feed resonance volume. The intermediate resonance volume is the sum of the volume of the intermediate resonator vessel 8 and the volume of the gas inlet pipe 9 or 15. Thus, the intermediate resonance volume is determined by a selection of the size of the intermediate resonator vessel 8 and the size of the gas intake pipe 9 or 15 in such a manner that upon adapting the intermediate resonance volume to the above-described feed resonance volume, a predetermined relationship between the two resonance rpm's is obtained. The ratio of the intermediate resonance volume to the feed resonance volume is at least 2, advantageously not more than 8 and has, in particular, a value of about 6.

As it was explained earlier, it is critical that both resonance rpm's be situated within the operational rpm range. Consequently, the farthest possible distance (that is, rpm difference) between the two resonance rpm's will be present if the first resonance rpm is chosen to be at or around the lowest rpm of the operational rpm range and the second resonance rpm is chosen to be located at or around the highest rpm of the operational rpm range. As also discussed earlier, the first resonance rpm is determined by the appropriate dimensioning of the feed resonance system while the locus of the second resonance rpm is determined by the ratio of the intermediate resonance volume to the feed resonance volume. Thus, the difference between the first and the second resonance rpm's depends on the ratio of the intermediate resonance volume to the feed resonance volume, and the greater the ratio the closer the two resonance rpm's to one another.

It has been found that if the two resonance rpm's are the farthest away from one another but still within the operational rpm range, the ratio of the intermediate resonance volume to the feed resonance volume must be at least 2. A higher ratio will bring the two resonance rpm's increasingly closer to one another, until they practically coincide which has little practical value for taking advantage of the invention. Tests have shown that at a ratio of 8–10 a still useful difference between the first and second resonance rpm's could be obtained. In certain engine designs the optimal ratio was found to be 3 in achieving the most advantageous increase in charging efficiency over the widest rpm range of the operational rpm spectrum. It is further noted that a given ratio of the intermediate resonance volume to the feed resonance volume sets a determined rpm ratio between the first and the second resonance rpm's regardless where the locus for the lower (first) resonance rpm is chosen in the operational rpm range. It is thus apparent that if the first resonance rpm is chosen to be, for example, in the middle of the operational rpm range, the ratio may be significantly higher than 2 to ensure that the second resonance rpm is also located in the operational rpm range.

Thus, according to the invention it is feasible to design the intake gas conduit system in such a manner that both rpm ranges which contain the respective resonance rpm and within which the charging efficiency is increased with the aid of gas oscillations, partially overlap to thus obtain a possibly balanced charging efficiency or torque characteristic. Expediently, the intake gas conduit system is designed such that the rpm at which a conventional reciprocating piston-type internal combustion engine has a maximum torque—that is, a maximum torque which may be achieved without resonance charging or without an intake gas conduit system according to the invention—which is between the two resonance rpm's. In this connection it is of particular advantage to design the intake gas conduit system such that the second resonance rpm is only slightly above an rpm at which the conventional engine has its maximum torque. By an appropriate control of the fuel admission it is, however, feasible to subsequently obtain with the arrangement according to the invention a new torque maximum to thus reshape the torque characteristics while taking into account resonance charging.

In the preferred embodiments of the invention the resonance frequency of the feed resonance system 2, 4, 5, 6 and 7 is, similarly to the arrangement described in German Patent No. 2,949,790, at least approximately identical to the resonance frequency of the auxiliary resonance system 11, 12. Furthermore, in the preferred embodiments of the invention according to FIGS. 1 and 2, the diameters of the feed resonance pipe 7 and the auxiliary pipe 11 are of identical size and are arranged in an axial alignment. Although these two characteristics are of advantage in designing an optimal intake gas conduit system according to the invention, the invention is effective even in the absence of these two characteristics.

In the design of an intake gas conduit system which has a first resonance rpm tuned to the lower part of the operational rpm range of the internal combustion engine, it is advantageous to provide for the feed resonance pipe 7 and expediently also for the auxiliary resonance pipe 11 a terminal pipe portion (or a portion adjacent thereto) of outwardly increasing diameter as illustrated at 7a and 11a for the resonance pipes 7 and 11 in FIG. 2. This arrangement for reducing the dimensions of the resonance pipes is known by itself, for example, from German Offenlegungsschrift No. 3,232,366 to which corresponds U.S. Pat. No. 4,513,699.

In the embodiment according to FIG. 2 where the intake gas supply to the intermediate resonator vessel 8 is effected by a charger 14, particularly a turbocharger and wherein the intake ports 4 of the cylinders 2 are coupled to the feed resonator vessel 6 in each instance by a coupling pipe 5, the length of the coupling pipes 5 is, according to U.S. Pat. No. 3,796,048 so designed that, expressed in meters, it should not exceed 1500/n, wherein n is the rated rpm of the internal combustion engine. With such a dimensioning oscillations in the coupling pipes 5 may be expediently prevented within the operational rpm range of the internal combustion engine 1, because such oscillations may adversely affect the combined turbocharging and resonance charging. In contradistinction, in an embodiment where the intake ports 4 of the cylinders 2 are connected with the feed resonator vessel 6 in each instance by means of a coupling pipe 5 and a separate charging device such as an exhaust gas turbocharger is not present, it may be of advantage if the coupling pipes 5 are longer. In such a case the length of the coupling pipes 5 is selected such that during the charging of the respective cylinder 2 at an rpm which is other than either resonance rpm of the intake gas conduit system where resonance charging appears and particularly at an rpm which is above these two rpm values, in the associated coupling pipe 5—particularly in the upper rpm range—pipe oscillations are generated which additionally increase the charging efficiency.

For the purpose of reducing the dimensions of the intake gas conduit system it is expedient to reduce the feed resonance volume to a possibly low value. Such a solution is illustrated in the embodiment according to FIG. 3 where the feed resonance pipe 7 has a conically flaring end portion 13 which merges with a rounded terminus 16 into the feed resonator vessel 6. The bounding wall 17 of the feed resonator vessel 6 has a flow dynamically advantageously shaped curved portion 18 at the locations 20 where the coupling pipes 5 of the two flanking cylinders 2 of the four-cylinder group merge into the feed resonator vessel 6.

Figure 3:
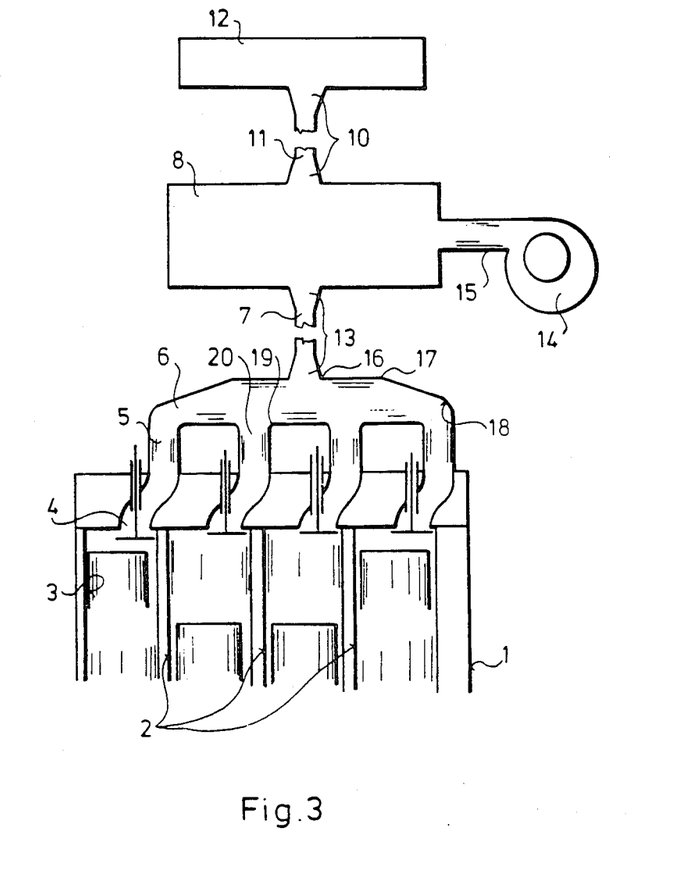
FIGS. 3 and 4 are schematic side elevational views of a third and fourth preferred embodiment with intake gas supply by an exhaust gas driven turbocharger.

The wall portion 19 which is situated between the openings 20 of adjoining connecting pipes 5 has a well rounded configuration. Such a structure makes possible a slight overlap between the suction strokes of the cylinders 2 coupled to the feed resonator vessel 6, which is the case, for example, in a four-cylinder in-line engine. In these engines the intake ports 4 of the two flanking cylinders 2 or, as the case may be, the openings 20 of the two flanking coupling pipes 5 are at a significant distance from one another, and the desired low value of the feed resonance volume is effected by providing that the feed resonator vessel 6 whose length is defined by the position of the intake ports 4 or, as the case may be, the openings 20 of the coupling pipes 5 has a small cross-sectional area. In order to avoid excessive flow losses, such a feed resonator vessel 6 is expediently provided with a flow dynamically advantageous rounded bounding wall 17 and well rounded joints at the openings 20.

The intake gas conduit system according to the invention may advantageously find application in reciprocating piston-type internal combustion engines where a plurality of cylinder groups may be formed if the intermediate resonator vessels associated therewith are not interconnected. Such an arrangement may be, for example, an eight-cylinder V-engine which is provided with two independent exhaust gas turbochargers which independently feed two separate intake gas conduit systems, that is, they separately feed four cylinders each.

The condition that the suction strokes of the cylinders forming one group in the resonance system incorporating the invention (and also in resonance systems of the discussed prior art) do not significantly overlap is securely satisfied by four-cylinder engines whose ignition interval corresponds to a main shaft angle of 180° and the open period of the intake valve does not significantly exceed a main shaft angle of 180°. The condition that the intake strokes of the individual cylinders should not significantly overlap is important both from the point of view of the generation of the oscillating system and the utilization of the gas oscillations for improving the degree of efficiency in charging the cylinder. A more significant overlap of the intake strokes of the cylinders does not prevent the appearance of resonance gas oscillations but causes a significant deterioration of the efficiency of cylinder charging compared to what may be achieved with the resonance phenomenon. Since the decrease in the maximum efficiency is caused by the fact that during the suction stroke of one cylinder the intake valve of another cylinder starts to open, the speed of increase of the open cross section becomes an influencing factor. In different engine constructions such a speed of increase is different which has to be taken into consideration in deciding whether or not there exists a significant overlap of the suction strokes.

Based on the above consideration the invention also encompasses a five-cylinder, four-cycle in-line engine in which at a given uniform turning angle of 144° of the crankshaft the suction strokes of the individual cylinders do not overlap significantly and therefore the charging efficiency increases with the use of the intake gas conduit system according to the invention although it does not reach the efficiency level that may be achieved with a four-cylinder, four-cycle in-line engine with a 180° crankshaft angle.

Figure 4:
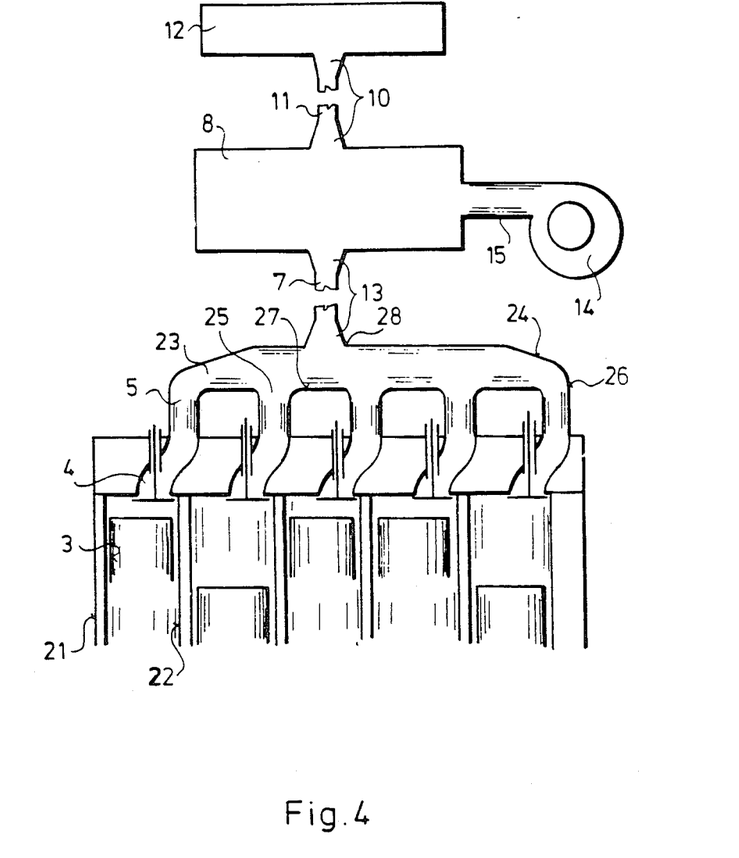

FIG. 4 illustrates an intake air conduit system—coupled to an exhaust gas turbocharger—of a five-cylinder, four-cycle in-line internal combustion engine according to the invention.

The five-cylinder, four-cycle, piston-type internal combustion engine 21 has five cylinders 22 whose ignition interval corresponds to a rotation of 144° of the crankshaft. Stated differently, the suction strokes of the cylinders 22 of the internal combustion engine 21 do not significantly overlap. The intake ports 4 of the cylinders 22 forming a five-cylinder group is connected by means of separate coupling pipes 5 individually to a common feed resonator vessel 23 into which opens a feed resonance pipe 7 through which intake gas is introduced. Further, there is provided an auxiliary resonance system formed of an auxiliary resonator vessel 12 and an auxiliary resonance pipe 11 opening thereinto. The auxiliary resonance pipe 11 is coupled to the feed resonance pipe 7 by means of an intermediate resonator vessel 8. The compressor of a turbocharger 14 is coupled to the intermediate resonator vessel 8 by means of a pressure pipe 15. The terminal length portions 10 and 13 of the respective resonance pipes 11 and 7 flare outwardly in a diffusor-like manner whereby the length of the resonance pipes 7 and 11 may be reduced even without changing the loci of resonance of the intake gas conduit system.

The length (in meters) of the connecting pipes 5 which couple the intake ports 4 of the cylinders 22 individually to the feed resonator vessel 23 does not exceed $1500/n$, where n is the rated rpm. By virtue of such a dimensioning the appearance of pipe oscillations which might adversely affect the combined turbocharging and resonance charging may be prevented in the connecting pipes 5 within the operational rpm of the internal combustion engine 1.

In an embodiment, however, where the intake ports 4 of the cylinders 22 are connected via a respective connecting pipe 5 with the feed resonator vessel 23 and no separate charging device such as an exhaust gas turbocharger is present, it may be advantageous to use longer connecting pipes 5. In such a case the length of the coupling pipes 5 is selected such that during the charging of the respective cylinder 22 at an rpm which is other than either resonance rpm of the intake gas conduit system where resonance charging appears and particularly at an rpm which is above these two rpm values, in the associated coupling pipe 5—particularly in the upper rpm range—pipe oscillations are generated which additionally increase the charging efficiency.

In case of an in-line arrangement of the five-cylinder internal combustion engine 21 the intake ports 4 of the two flanking cylinders 22 or, as the case may be, the respective connecting pipes 5 have a distance which is relatively large for forming a feed resonator vessel 23 of advantageous dimensions. For this reason, the wall 24 of the feed resonator vessel 23 at the opening 25 of the connecting pipe 5 of the two flanking cylinders 22 is provided with an aerodynamically advantageous curvature 26. The wall 27 of the feed resonator vessel 23 extending between junctions 25 of adjoining connecting pipes 5 is distinctively rounded and similarly, in order to increase the flow dynamic efficiency, the feed resonance pipe 7 has a conically flaring terminal portion 13 which joins the feed resonator vessel 23 with a rounded pipe junction 28.

The intake gas conduit system according to the invention may find advantageous application also in piston-type internal combustion engines where a plurality of cylinder groups—each consisting of five cylinders—may be formed provided that the intermediate resonator vessels of the groups are not interconnected. Such may be, for example, a ten-cylinder V-engine, in case it is provided with two independent exhaust gas turbochargers which supply a separate intake gas conduit system (that is, five cylinders in each instance) independently from one another.

The present disclosure relates to subject matter contained in Hungarian Patent application No. 546/87 (filed Feb. 12th, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a reciprocating piston-type internal combustion engine including
    a plurality of cylinders each having an intake port;
    an intake gas conduit assembly in which intake gas resonance oscillations are generated for increasing the charging efficiency of the cylinders; said intake gas conduit assembly having
    a feed resonance system including a feed resonator vessel connected with the intake ports of a group of cylinders whose suction strokes do not significantly overlap; and a feed resonance pipe communicating with said feed resonator vessel;
    an auxiliary resonance system including a closed auxiliary resonator vessel and an auxiliary resonance pipe opening into said auxiliary resonator vessel;
    an intermediate vessel coupled with said auxiliary resonance pipe and said feed resonance pipe;
    an intake gas inlet pipe coupled with said intermediate vessel;
    the feed resonance system and the auxiliary resonance system are tuned to one another by a dimensional selection such that at a predetermined first resonance rpm of the engine the intake gas oscillations generated in the feed resonance pipe and the auxiliary resonance pipe by intermittent suction strokes of the cylinders forming said group are in phase effecting an increase in the charging efficiency;
    the improvement wherein said intermediate vessel is an intermediate resonator vessel dimensioned such that at a predetermined second resonance rpm in an operational rpm range of the engine the intake gas oscillations in said feed resonance pipe and said auxiliary resonance pipe are of opposite phase, effecting an increase in the charging efficiency.

2. An internal combustion engine as defined in claim 1, wherein said intake gas conduit assembly has a feed resonance volume composed of the volume of the feed resonator vessel and an average volume of the cylinders simultaneously open towards said feed resonator vessel during one gas intake stroke; further wherein said intake gas conduit assembly has an intermediate resonance volume composed of the volume of said intermediate resonator vessel and the volume of said intake gas inlet pipe; and further wherein the ratio of the intermediate resonance volume to said feed resonance volume is at least 2.

3. An internal combustion engine as defined in claim 1, further comprising separate coupling pipes connecting the intake port of each said cylinder to said feed resonator vessel; further wherein said intake gas conduit assembly has a feed resonance volume composed of the volume of the feed resonator vessel, the volume of the coupling pipes and an average value of the cylinder volumes simultaneously open towards said feed resonator vessel during one gas intake stroke; further wherein said intake gas conduit assembly has an intermediate resonance volume composed of the volume of said intermediate resonator vessel and the volume of said intake gas inlet pipe; and further wherein the ratio of the intermediate resonance volume to said feed resonance volume is at least 2.

4. An internal combustion engine as defined in claim 1, wherein said intake gas conduit assembly is dimensioned such that an rpm range which contains said first resonance rpm and whose rpm's other than said first resonance rpm also effect an increase in the charging efficiently, and an rpm range which contains said second resonance rpm and whose other rpm's also effect an increase in the charging efficiently are in a partially overlapping relationship.

5. An internal combustion engine as defined in claim 1, wherein said feed and auxiliary resonance pipes have opposite ends; at least the feed resonance tube of said feed and auxiliary resonance tubes has length portions in the zone of said ends; said length portions have a diameter increasing towards respective adjacent ends.

6. An internal combustion engine as defined in claim 1, further comprising a charging device connected to said intake gas inlet pipe and separate coupling pipes connecting the intake port of each said cylinder to said feed resonator vessel; the length of each coupling pipe is 1500/n meter at the most, wherein n represents the rated rpm of the engine.

7. An internal combustion engine as defined in claim 1, further comprising separate coupling pipes connecting the intake port of each said cylinder to said feed resonator vessel; the length of each coupling pipe is dimensioned such that pipe oscillations effecting an increase in the charging efficiency of a cylinder momentarily communicating with the coupling pipe associated therewith are generated in said coupling pipe.

8. An internal combustion engine as defined in claim 1, wherein the number of the cylinders of said group is five.

9. An internal combustion engine as defined in claim 1, further comprising a compressor having a pressure pipe; said intake gas inlet pipe constituting said pressure pipe.

10. An internal combustion engine as defined in claim 1, wherein said intake gas conduit assembly is dimensioned such that the rpm at which the engine has a maximum torque, is between said first and second resonance rpm's.

11. An internal combustion engine as defined in claim 10, wherein said second rpm is slightly above the rpm at which the engine has a maximum torque.

12. An internal combustion engine as defined in claim 1, wherein the resonance frequency of said feed resonance system is at least approximately equal to the resonance frequency of said auxiliary resonance system.

13. An internal combustion engine as defined in claim 12, wherein said feed resonance pipe and said auxiliary resonance pipe have respective diameters and longitudinal axes; further wherein said diameters are identical and said axes are in alignment with one another.

14. An internal combustion engine as defined in claim 1, wherein said intake gas inlet pipe is a resonance pipe.

* * * * *